United States Patent
Reinke et al.

(10) Patent No.: US 8,523,225 B2
(45) Date of Patent: Sep. 3, 2013

(54) OVERHEAD FRAME STRUCTURE SYSTEM

(75) Inventors: Randy R. Reinke, Hopkins, MN (US);
Steven R. Becker, Litchfield, MN (US);
James P. Schmitt, Litchfield, MN (US)

(73) Assignee: Custom Products of Litchfield, Inc., Litchfield, MN (US)

( * ) Notice: Subject to any disclaimer, the term of this patent is extended or adjusted under 35 U.S.C. 154(b) by 149 days.

(21) Appl. No.: 12/913,485

(22) Filed: Oct. 27, 2010

(65) Prior Publication Data
US 2012/0104802 A1    May 3, 2012

(51) Int. Cl.
*B60R 21/13* (2006.01)
(52) U.S. Cl.
USPC ..................... 280/756; 296/190.03
(58) Field of Classification Search
USPC ..................... 280/756; 296/190.03
See application file for complete search history.

(56) References Cited

U.S. PATENT DOCUMENTS

| | | | | |
|---|---|---|---|---|
| 3,214,211 | A * | 10/1965 | Setina | 296/24.46 |
| 4,666,183 | A * | 5/1987 | Azzarello | 280/756 |
| 5,503,430 | A * | 4/1996 | Miki et al. | 280/756 |
| 5,779,272 | A * | 7/1998 | Panek et al. | 280/756 |
| 5,942,835 | A * | 8/1999 | Furuhashi et al. | 310/316.01 |
| 7,661,709 | B2 * | 2/2010 | Becker | 280/756 |
| 7,971,905 | B2 * | 7/2011 | McCord et al. | 280/756 |
| 8,029,019 | B2 * | 10/2011 | Schmidt et al. | 280/756 |

FOREIGN PATENT DOCUMENTS
DE     102006054396 A1 *  5/2008

* cited by examiner

*Primary Examiner* — Joseph Rocca
*Assistant Examiner* — Darlene P Condra
(74) *Attorney, Agent, or Firm* — Fredrikson & Byron, P.A.

(57) ABSTRACT

Overhead frame structures for a vehicle that are adjustable for modifying the overall height of the vehicles yet meet an industry-recognized standard of rollover protection for the operator of the vehicle regardless of such adjustment to the structure. In some cases, the structures are incorporated with brackets at their adjustable connection areas. The brackets have separate members for one or more of aligning and supporting adjustable members of the structure.

24 Claims, 5 Drawing Sheets

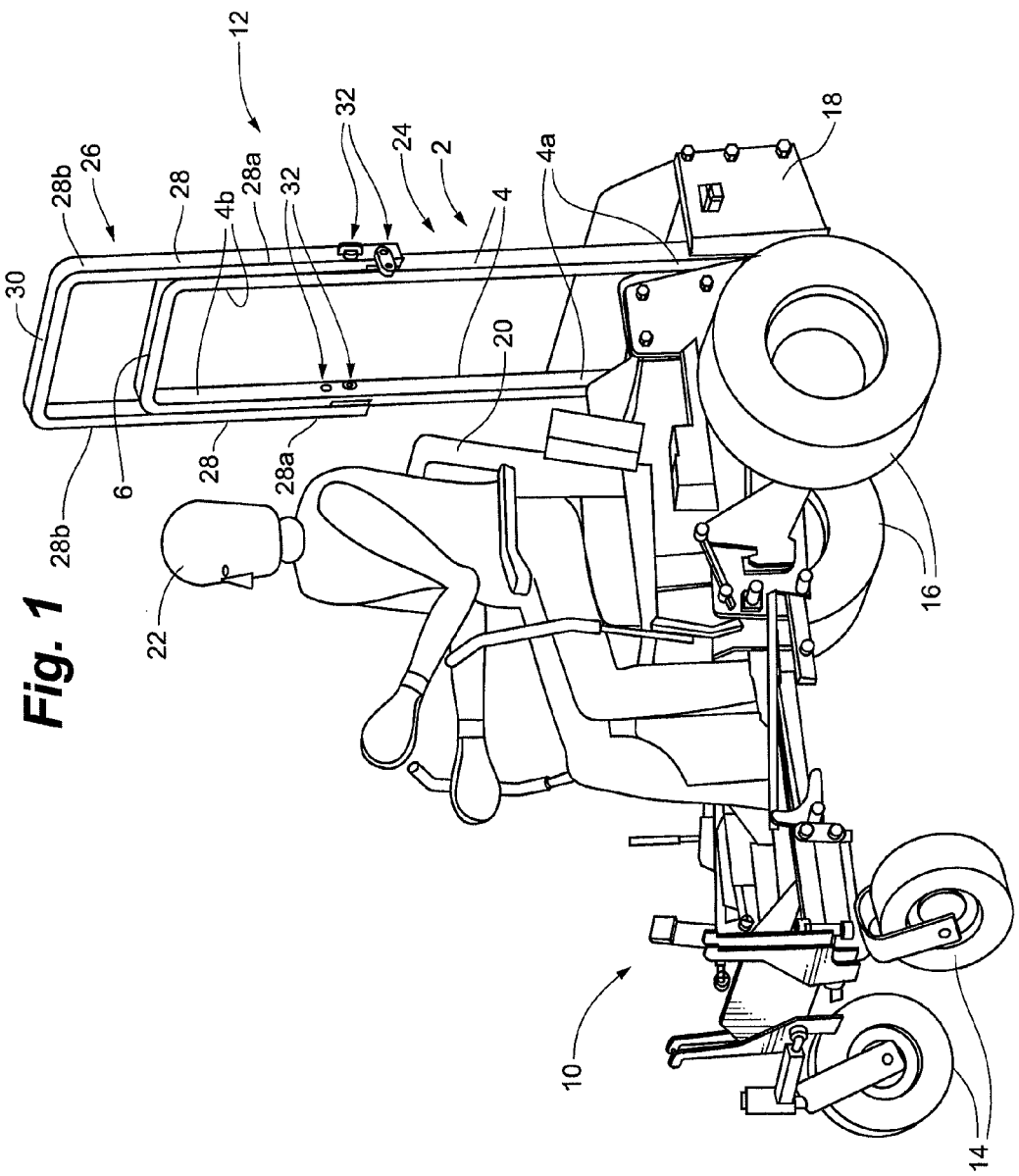

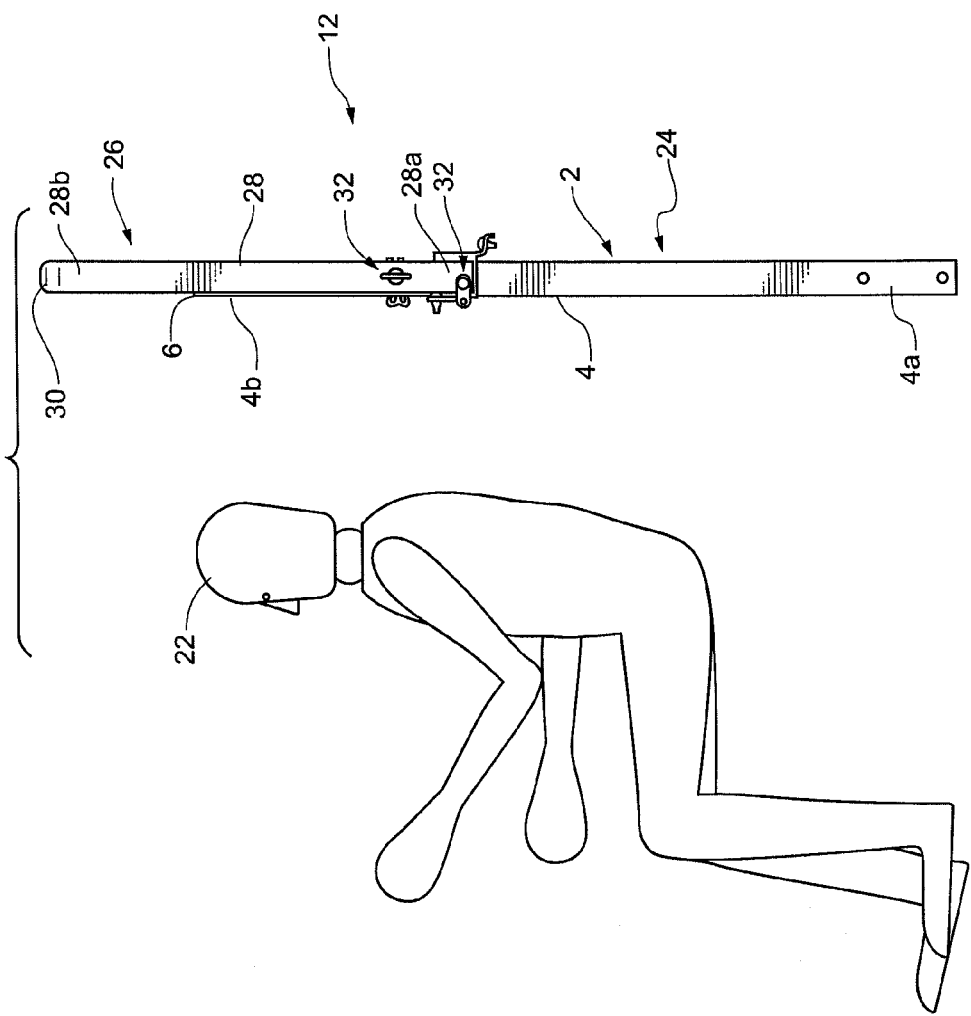

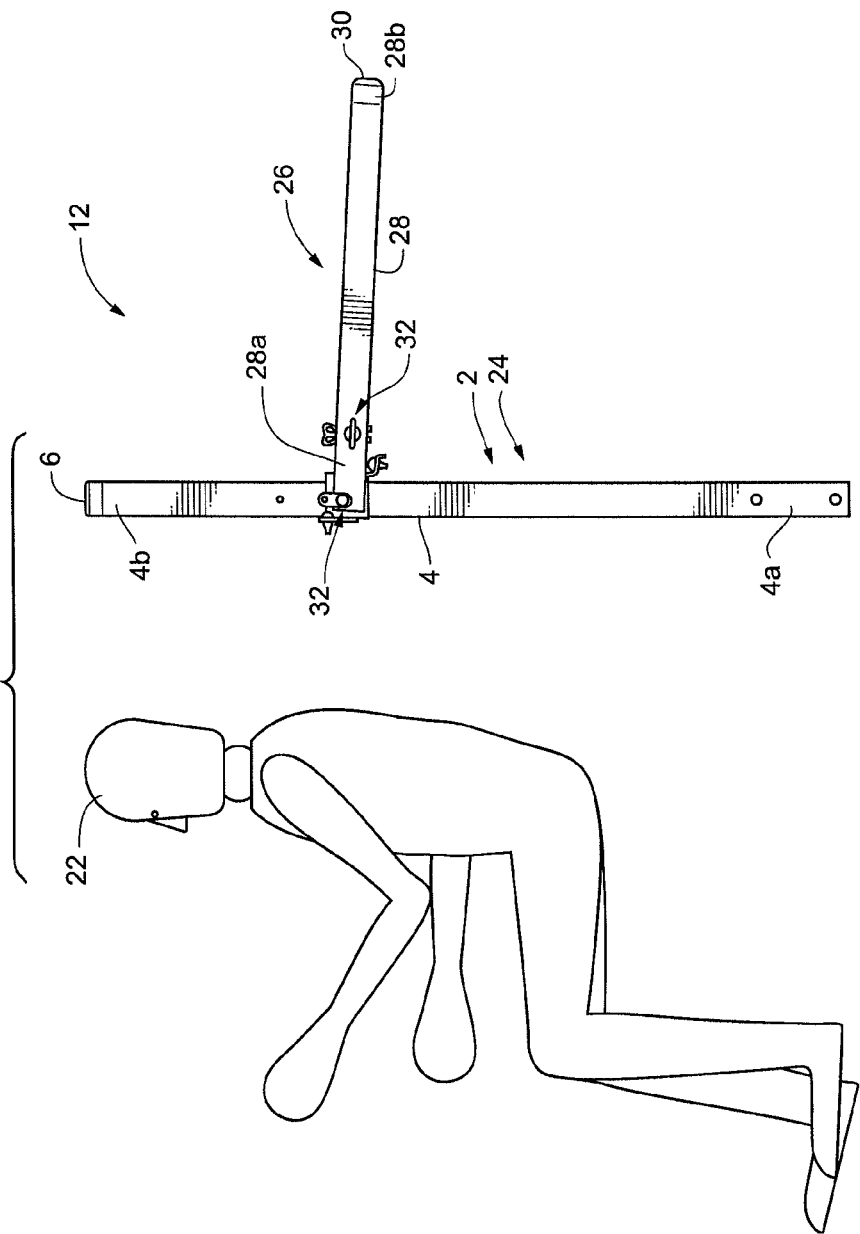

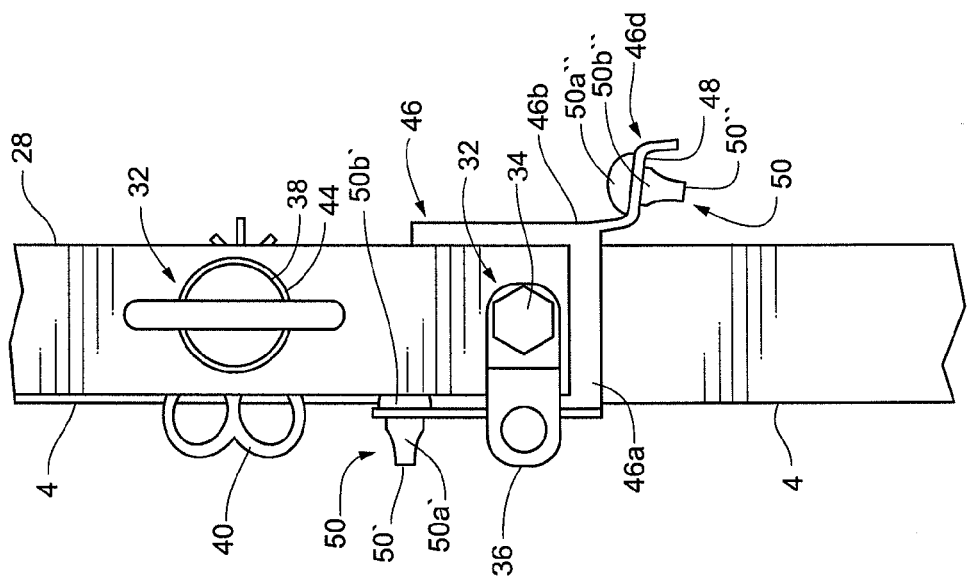

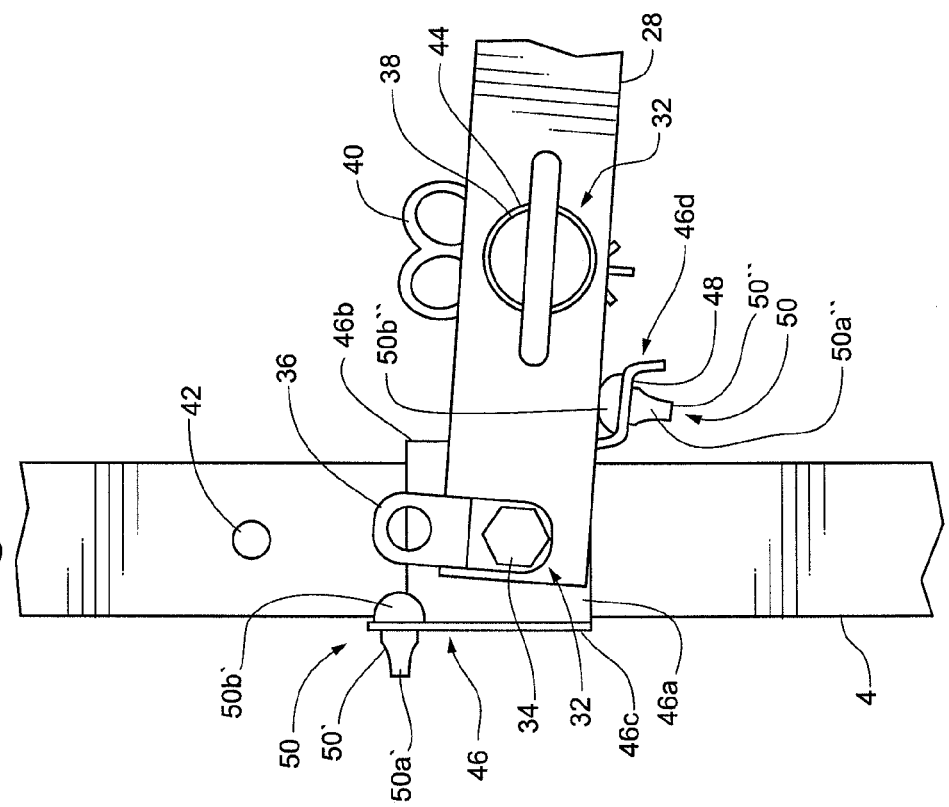

OVERHEAD FRAME STRUCTURE SYSTEM

FIELD

The invention relates to overhead frame structures utilized on vehicles, and in particular, to structures capable of meeting an industry-recognized standard of rollover protection regardless of height adjustment made to the structures.

BACKGROUND SECTION

Overhead frame structures are typically fabricated of one or more members forming a framework. Such structures can be used on a vehicle for one or more reasons. The structures can be utilized to protect an operator from injury in the event of accidental upset or inadvertent rollover of the vehicle. Additionally, the structures can be used for mounting various accessories thereto. Further, the frameworks of the structures can be used to mount enclosure elements thereto.

While mounting an overhead frame structure on a vehicle may be advantageous for a variety of reasons as exemplified above, certain situations may exist in which one would want to temporarily modify the structure's configuration. For example, in many cases, as a result of the structure being mounted to the vehicle, the vehicle's height is increased significantly. Consequently, the process of maneuvering the vehicle in low overhead clearance areas may be difficult or not feasible. To address such scenarios, certain overhead frame structures have been designed to be adjustable. For example, in some designs, an upper section of the structure is made adjustable with respect to a lower section of the structure. Accordingly, the upper section can be lowered with respect to the lower section to temporarily reduce the overall height of the overhead frame structure. In some designs, this adjustment is facilitated by removal of at least one arresting device used to hold the upper section in its position, either directly or through the use of an interconnecting bracket. In such designs, the arresting members can involve fasteners such as linchpins, which enable quick changeover of the overhead frame structure from one configuration (e.g., with upper section being raised) to another configuration (e.g., with upper section being lowered).

However, while the adjustability of these overhead frame structures can be viewed as advantageous, upon being adjusted to their lowered configuration, the structures fall short of meeting industry-recognized standards for rollover protection. Particularly, when the upper sections of such structures are lowered, their corresponding crossbars are positioned at a height not meeting the standard requirements for providing rollover protection for the operator. Further, after the structure is adjusted to its lowered configuration, the operator may continue to leave the upper section lowered for extended periods of time. Consequently, during these periods of time, the structures continue to fall short of meeting industry-recognized standards for rollover protection.

Embodiments of the present invention are directed to addressing these limitations.

SUMMARY

Embodiments of the invention relate to overhead frame structures for a vehicle. The structures are adjustable for modifying the overall height of the vehicles yet meet an industry-recognized standard of rollover protection for the operator of the vehicle regardless of such adjustment to the structure. In some cases, the structures are incorporated with brackets at their adjustable connection areas. The brackets have separate members for one or more of aligning and supporting adjustable members of the structure.

In some embodiments, an overhead frame structure for a vehicle is provided. The structure comprises a lower section and an upper section adjustably coupled to the lower section. The upper section is adjustable to different positions in relation to the lower section. Two of the positions involve a raised position and a lowered position. The overhead frame structure is configured to meet one or more industry-recognized standards for rollover protection for an operator of the vehicle regardless of position of the upper section.

Additionally, in some embodiments, an overhead frame structure for a vehicle is provided. The structure comprises a first segment comprising a first crossbar and a second segment comprising a second crossbar. The second crossbar is adjustably coupled to the first crossbar such that the second crossbar can be positioned at one of a lower height with respect to the first crossbar or a higher height with respect to the first crossbar. The second crossbar vertically offset from the first crossbar when the second crossbar is at the higher height. The overhead frame structure is configured to meet one or more industry-recognized standards for rollover protection for an operator of the vehicle regardless of position of the second crossbar.

Also, in some embodiments, an overhead frame structure for a vehicle is provided. The structure comprises a lower section and an upper section adjustably coupled to the lower section. The upper section has two mounting positions in relation to the lower section, the two mounting positions comprising a raised position and a lowered position. When the upper section is in the raised position, the lower and upper sections in combination meet first industry-recognized standards for rollover protection for an operator of the vehicle, and when the upper section is in the lowered position, the lower section meets a second industry-recognized standard for rollover protection for the operator of the vehicle.

Further, in some embodiments, an overhead frame structure for a vehicle is provided. The structure comprises a lower section including two posts having upper portions joined via a crossbar, and an upper section including two posts having upper portions joined via a crossbar. Each of the upper section posts are rotatably coupled to a corresponding one of the lower section posts. A bracket is incorporated at each coupling area of the upper and lower section posts. The bracket includes separate members for one or more of aligning and supporting the upper section posts in each of raised and lowered positions of the upper section.

BRIEF DESCRIPTION OF THE DRAWINGS

FIG. 1 is a side perspective view of a vehicle, illustrating an overhead frame structure in accordance with certain embodiments of the invention, showing an upper section of the overhead frame structure in a raised position.

FIG. 2 is a side elevation view of the overhead frame structure of FIG. 1 in relation to an operator.

FIG. 3 is a further side elevation view of the overhead frame structure of FIG. 1 in relation to an operator, showing the upper section of the overhead frame structure in a lowered position.

FIG. 4 is an enlarged perspective view of a connection area of the overhead frame structure of FIG. 1 as depicted in FIG. 2.

FIG. 5 is an enlarged perspective view of a connection area of the overhead frame structure of FIG. 1 as depicted in FIG. 3.

DETAILED DESCRIPTION OF THE PREFERRED EMBODIMENTS

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. For example, the invention is generally designed for use on vehicles such as mowing and agricultural equipment; however, it may also be used on other vehicles such as golf carts, go-carts, all-terrain vehicles, utility vehicles, construction equipment, and the like.

In many vehicle designs, an overhead frame structure is used. As described above, such a structure can be utilized for a number of different functions. In light of this, it should be appreciated that the overhead frame structure of the invention can involve the use of (and could alternatively be referenced as) a rollover protective structure (ROPS), a falling object protective structure (FOPS), an accessory frame, a cab frame, or any combination thereof. As described above, the overhead frame structure is typically formed of an upper section and a lower section, with each section having one or more members. Accordingly, in some exemplary cases (as depicted herein), the members can be assembled to form an overhead frame structure located proximate to the operator of the vehicle, e.g., a ROPS. In some other exemplary cases, the members can be assembled to form a structure configured for surrounding the operator, e.g., a cab frame.

In designs to date, as described above, overhead frame structures generally involve lower and upper sections. The lower section of these structures typically includes two or more generally vertical segments having lower portions operatively coupled to the frame of the vehicle. Further, the upper section of the structures typically includes one or more generally horizontal segments having end portions that extend downward and are operatively coupled to upper portions of the lower section vertical segments. While sharing certain of the above-described attributes, the overhead frame structure embodied herein addresses the limitations of conventional designs commercialized to date. For example, the embodied overhead frame structure is configured for its upper section to be adjusted to either a raised or lowered position with respect to its lower section, while the structure meets an industry-recognized standard of rollover protection for an operator in either position of the upper section.

To appreciate the nature of the underlying issues at hand, one should understand that operators have historically voiced their reluctance to have overhead frame structures applied to their vehicles, such as with turf maintenance machines. One reason behind this reluctance may be the perceived nuisance to the operator of having to stop his work in order to lower the structure's upper section when encountering low overhead clearance areas. In turn, when overhead clearance no longer remains an issue, there is the need to subsequently raise such upper section to restore its capability to provide rollover protection per SAE standards and/or OSHA standards (as further described below). However, as described above, once the upper section is lowered, operators are free to raise the upper section at their discretion. Accordingly, this can often take place well after working in low overhead clearance areas. As such, not only during the time when working in such areas, but also during the time afterward in which the upper section remains lowered, the structure fails to meet the rollover protection constraints of either SAE or OSHA standards.

ISO (International Standards Organization), in recognizing this dilemma, recently adopted ISO Standard 21299 relating to low-profile ROPS. While ISO 21299 is involved with regulation of powered ride-on turf maintenance equipment, it is foreseeable that the standard's implementation could lead to a chain reaction regarding ISO standards regulating other like-powered equipment for which ROPS are designed. Prior to ISO 21299 being adopted, there was no specific standard for low-profile ROPS products, as the SAE and OSHA industry-recognized standards to date relate to ROPS products having higher profiles by comparison. To that end, ISO 21299 offers a ROPS qualification procedure to address the safety of operators, with due consideration seemingly also made regarding the operator resistance encountered to date for high-profile ROPS designs. To its credit, ISO created a relatively broad standard with ISO 21299, such that it could be met via a variety of designs. For example, one such design involves a non-folding, low clearance ROPS 2, as illustrated in FIG. 1.

FIG. 1 shows a side perspective view of a vehicle 10, illustrating an overhead frame structure 12 in accordance with certain embodiments of the invention. While a mowing vehicle is generally shown as the vehicle 10 in FIG. 1, as described above, the invention should not be limited to such. In certain embodiments, as shown, the vehicle 10 has front wheels 14, rear wheels 16, a frame 18, a seat 20, and the overhead frame structure 12. As shown, the seat 20 is designed to accommodate an operator 22; however, in certain embodiments, the seat 20 can alternatively be configured to accommodate both the operator 22 and a passenger. Also, while not shown, it is to be appreciated that the vehicle will include an engine compartment generally supported by the frame 18.

As shown, the ROPS 2 is incorporated as part of the overhead frame structure 12; however, it should be appreciated that other ROPS designs, meeting the constraints of ISO 21299, could alternatively be incorporated as part of the structure 12. In certain embodiments, the ROPS 2 is formed of at least two posts 4 operatively coupled at their lower portions 4a to the vehicle 10. As shown, in certain embodiments, the posts 4 extend in a generally vertical direction from the vehicle 10. In certain embodiments, a fastener assembly (not shown) is used to secure the lower portions 4a of the posts 4 to the vehicle frame 18. As such, at least one fastener assembly would be used on each lower portion 4a that makes contact with the frame 18. In certain embodiments, each fastener assembly would include at least one threaded bolt and one threaded nut. However, it should be appreciated that any of a variety of fastener assemblies could alternately be used to secure the posts 4 (and in turn, the ROPS 2, and further in turn, the structure 12) to the frame 18 without departing from the spirit of the invention.

As further shown, in certain embodiments, the posts 4 of the ROPS 2 include upper portions 4b that are joined via a crossbar 6. As shown, in certain embodiments, the crossbar 6 extends along a generally horizontal line between the upper portions 4b of the posts 4. The crossbar 6, as exemplarily illustrated in FIG. 2, is configured to lie proximate to, yet to the rear, of the head of the operator 22. Based on ISO 21299, the ROPS 2 meets the structural requirements of the standard, while not being considered a nuisance with respect to the height it adds to the vehicle 10. However, while meeting the constraints of ISO 21299, the ROPS 2 if singularly used would fall short of the SAE and OSHA industry-recognized standards related to higher-profile ROPS.

To that end, such SAE and OSHA industry-recognized standards for ROPS designs require the ROPS crossbar to be at a height above (and often well above) the head of the operator. As a result, conventional ROPS designs meeting one or more of these standards typically involve high-profile structures that at least encircle the operator at a wide (yet often varying) radius. Consequently, one or more portions of the ROPS, rather than the operator, are far more likely to initially contact the ground during an actual rollover of the vehicle. Further, the ROPS, via its expanded size, increases the protective pocket or safe zone for the operator during an actual rollover event. However, as described above, such ROPS designs generally necessitate significant increase in the overall height of vehicles, which limits their use in low overhead clearance areas.

As embodied in FIGS. 1 and 2, applicants have designed the overhead frame structure 12 to address the above problems. As described above, in certain embodiments, the structure 12 is formed with a lower section 24 involving a low-profile ROPS design that meets the requirements of ISO 21299, such as the ROPS 2. Further, the structure 12 is formed with an upper section 26 involving a high-profile ROPS design that meets the requirements of one or more of the SAE and OSHA industry-recognized standards for ROPS products. To that end, while high profile ROPS designs may be found to meet the requirements of both the SAE and OSHA standards, it is not an absolute, and in some instances, it is more a matter of meeting one or the other of such SAE and OSHA standards as both are recognized in the industry. Similar to the features of the ROPS 2 of the structure 12, in certain embodiments, the upper section 26 is formed of at least two posts 28 integrally joined at their upper portions 28b via a crossbar 30. As shown, in certain embodiments, the posts 28 of the upper section 26 extend in a generally vertical direction from the posts 4 of the lower section 24 when the upper section 26 is in its raised position. As further shown, in certain embodiments, the crossbar 30 extends along a generally horizontal line between the upper portions 28b of the posts 28.

Both the lower and upper sections 24, 26 are formed of a rigid material (e.g., steel). In certain embodiments, as shown, the lower and upper sections 24, 26 involve tubing having a generally rectangular outer shape; however, the invention should not be limited to such. Instead, it is to be understood that one or more of the lower and upper sections 24, 26 can just as well be formed of solid material and/or have alternative outer shapes.

As described above, in certain embodiments, the posts 28 of the upper section 26 generally extend from the posts 4 of the lower section 24. Particularly, in certain embodiments, the upper section posts 28 are operatively joined to outer walls of the lower section posts 4. However, the invention should not be limited to such, as the lower and upper sections 24, 26 can just as well be operatively joined in different configurations, e.g., the upper section posts 28 being joined to the inside walls of, or within (e.g., in telescopic relation to), the lower section posts 4. Continuing with the above-described construction in which the upper section posts 28 are operatively joined to outer walls of the lower section posts 4, in certain embodiments, lower portions 28a of the posts 28 are operatively joined with upper portions 4b of the posts 4. Accordingly, the crossbar 30 of the upper section 26 is vertically offset from the crossbar 6 of the lower section 24 when the upper section 26 is in the raised position. The posts 28 and 4, in certain embodiments, are operatively joined using fastener assemblies 32 (as will be further described herein). Via use of such fastener assemblies 32, the upper section 26 is enabled to be adjustably joined with the lower section 24, with such adjustable coupling being further detailed herein.

FIGS. 2 and 3 illustrate side elevation views of the overhead frame structure 12, and show the location of the operator 22 in proximity to the structure 12 in accordance with certain embodiments of the invention. For simplicity purposes, FIGS. 2 and 3 do not show the vehicle 10 depicted in FIG. 1. However, with the location of the overhead frame structure 12 and the operator 22 being illustrated (i.e., whereby the vehicle seat 20 of FIG. 1 would accommodate the operator 22), one skilled in the art would appreciate the vehicle's normal inclusion in FIGS. 2 and 3 even if not visibly shown.

As shown in FIGS. 2 and 3, in certain embodiments, the overhead frame structure 12 is located rearward of the operator 22. While FIG. 2 exemplifies the upper section 26 of the structure 12 set in a raised position with respect to the lower section 24, FIG. 3 exemplifies the upper section 26 set in a lowered position with respect to the lower section 24. When in its lowered position, the upper section 26, in certain embodiments, extends generally downward, being lowered such that the height of the overhead frame structure 12 is closer to the height of the head of the operator 22 than when the upper section 26 is in its raised position. When the upper section 26 is in its lowered position, the crossbar 30 of the upper section, in certain embodiments, can be at a lower height than the crossbar 6 of the lower section 24.

Conversely, as shown in FIG. 2 (as well as in FIG. 1), when set in its raised position, the upper section 26, in certain embodiments, extends generally upward, being raised such that the height of the overhead frame structure 12 is higher than the height of the operator 22 than when the upper section is in its lowered position. Further, when the upper section 26 is in its raised position, the crossbar 30 of the upper section, in certain embodiments, can be at a higher height than the crossbar 6 of the lower section 24. Additionally, as shown in FIG. 2, in certain embodiments, the crossbar 30 of the upper section 26 in such raised position can be vertically aligned with the crossbar 6 of the lower section 24; however, the invention should not be limited to such.

Thus, as described above, the overhead frame structure 12 is configured for its upper section 26 to be adjustably positioned in either a raised or lowered position with respect to its lower section 24, while the structure 12 provides rollover protection in either position of the upper section 26. In certain embodiments, when the upper section 26 is in its lowered position, the lower section 24 is the primary means of rollover protection, wherein the lower section 24 meets the constraints of ISO 21299. Additionally, in certain embodiments, when the upper section 26 is in its raised position, the upper section 26 provides the primary means of rollover protection, wherein the upper section 26 meets the constraints of one or more of the SAE and OSHA industry-recognized standards related to higher-profile ROPS. Enabling the overhead frame structure 12 to meet an industry-recognized standard of rollover protection for the operator 22 of the vehicle 10 regardless of position of the upper section 26 represents a distinct departure from the adjustable overhead frame structures used on vehicles to date.

For example, as described above, for work in low overhead clearance areas, while conventional overhead frame structures have been configured to be adjustable so as to be lowered (thereby enabling operation of the vehicle in such areas), once lowered, the structure and its protective functionality become compromised. However, with the structure 12 as shown, when the upper section 26 is set in a lowered position, the rollover protection functionality of the structure 12 shifts to the ROPS 2, the design of which meets the requirements of ISO 21299.

Additionally, as described above, once the upper section of these conventional structures is lowered, it is at the discretion of the operator when and if the upper section is subsequently raised. Thus, not only during the time when working in low overhead clearance areas, but also during the time afterward in which the upper section remains lowered, rollover protection for the operator is compromised. However, with the structure 12 as shown, the ROPS 2 provides such rollover protection functionality (per the requirements of ISO 21299) during these periods of time.

Further, even in spite of the ROPS 2 meeting the requirements of ISO 21299 (and its capability of providing rollover protection), it is likely that demand for conventional ROPS designs would continue to exist. In particular, as described above, many companies that utilize such vehicles (as well as inspectors of such vehicles) may continue to seek the higher-profile ROPS designs that meet the long-standing SAE and/or OSHA industry-recognized standards. The structure 12 embodied herein is configured to meet one or more of these standards when the upper section 26 is in its raised position. However, unlike conventional overhead structure designs, when the upper section 26 is in its lowered position, the embodied structure 12 via the ROPS 2 further meets the industry-recognized standard now adopted as ISO 21299.

Accordingly, the desires of both the operator 22 and presumably companies (preferring to have their vehicles equipped with overhead structures that meet one or more of the SAE and OSHA industry-recognized standards) are addressed through use of the embodied overhead frame structure 12. In particular, the ISO 21299 standard for low-profile ROPS designs is met when the upper section 26 is in its lowered position. As such, the operator 22 can adjust the upper section 26 to its lowered position as needed, while the structure 12 continues to meet the corresponding safety standard following such adjustment. Further, the SAE and/or OSHA industry-recognized standards for high-profile ROPS designs are met when the upper section 26 is in its raised position. Thus, the embodied structure 12 provides dual rollover configurations, each meeting an industry-recognized standard regardless of the position of the upper section 26.

FIGS. 4 and 5 are enlarged perspective views of a connection area of the overhead frame structure 12 as shown in FIGS. 2 and 3, respectively. As described above, in certain embodiments, each of the posts 28 of the upper section 26 is operatively joined to a corresponding post 4 of the lower section 24, forming the above-referenced connection area. As such, while FIGS. 4 and 5 illustrate a single connection area, it is to be understood that such connection area is similarly provided for each pair of operatively-joined posts 28 and 4. As shown, the posts 28 and 4, in certain embodiments, are operatively joined at such connection area using one or more of the fastener assemblies 32. Via the use of such fasteners assemblies 32, the upper section 26 is enabled to be adjustably coupled with the lower section 24, and in some cases, to be secured in position.

In certain embodiments, the fastener assemblies 32 used at the connection areas can be of differing types and sizes, as the case necessitates. For example, as shown in FIGS. 4 and 5, in certain embodiments, each post 28 of the upper section 24 is operatively joined to a corresponding post 4 of the lower section 26 via use of a first fastener assembly, e.g., a through bolt 34 and a corresponding nut (not visibly shown); however, it should be appreciated that another like-fastener assembly could alternately be used. In use, the through bolt 34 is fed through aligning bores (not visibly shown) in the posts 28 and 4. The bolt 34 is only threaded at its distal end, enabling the posts 28 and 4 that are joined thereby to be freely rotatable with respect to one another (about a non-threaded mid-portion of the bolt 34).

As described above with reference to FIG. 1, the lower portions 4a of the lower section posts 4 are operatively coupled to the vehicle frame 18, thereby keeping the lower section 24 (ROPS 2) rigidly mounted to the vehicle 10. Accordingly, with the lower section 24 rigidly secured, the upper section 26 represents the rotatable section of the structure 12. As should be appreciated, based on the crossbar 30 of the upper section 26 connecting the upper portions 28b of its posts 28, the whole of the upper section 26 is configured to rotate in unison with the posts 28.

Continuing with the above (i.e., feeding the bolt 34 through the above-described bores of the posts 28 and 4), in certain embodiments, a certain degree of play is provided in the connection to further enable rotation of the upper section post 28. Various ways are known for achieving such play, with one well-known way being to use one or more intermediaries with each through bolt 34. For example, a washer or other like body defining a pass-through bore therein can be used between the head of the bolt 34 and the wall of the post 28 it faces and/or between the corresponding nut (not visibly shown) for the bolt 34 and the wall of the post 4 it faces. In certain embodiments, as shown, one such intermediary can involve a plate 36 defining one or more bores therein, at least one of which can accept the bolt 34.

Thus, use of the first fastener assembly, e.g., the through bolt 34 and corresponding nut, enables each pair of upper and lower section posts 28 and 4 to be operatively joined. Further, with the use of one or more intermediaries, the adjustability of the upper section posts 28 with respect to the lower section posts 4 can be further enabled. In certain embodiments, the connection areas for each pairing of upper and lower section posts 28 and 4 are offset from the vehicle frame 18 by a substantially-similar vertical distance. As such, the through bolts 34 used in operatively joining the posts 28 and 4 are longitudinally aligned, thereby forming an axis about which the upper section 26 pivots, when rotated either to its raised position (as shown in FIGS. 1, 2, and 4) or its lowered position (as shown in FIGS. 3 and 5).

In certain embodiments, a second fastener assembly is used in securing the upper section 26 once it is adjusted to a raised position. However, the invention should not so limited, as other securing means could alternately be used, e.g., such as a rotatable latch extending from the lower section post 4. In certain embodiments, when using a second fastener assembly, it can involve a linchpin 38 with corresponding retaining key 40; however, it should be appreciated that another like-fastener assembly could alternately be used.

In certain embodiments, as shown in FIG. 5, when the upper section 26 is in its lowered position, the first fastener assembly (e.g., the through bolts 34 and corresponding nuts) can be solely used in operatively joining the upper section posts 28 to the lower section posts 4 (and in turn, operatively joining the upper section 26 to the lower section 24). However, in adjusting the upper section 26 to its raised position, its posts 28 align with portions of the lower section posts 4 (as illustrated in FIG. 4), necessitating a means for securing the posts 28 in such raised position. In certain embodiments, when using a second fastener assembly (e.g., the linchpins 38 and corresponding retaining keys 40) as such means, the posts 28 and 4 are secured together in a similar fashion as used with the first fastener assembly. In particular, bores in both upper and lowers section posts 28, 4 are aligned upon the upper section 26 (and its posts 28) being adjusted to its raised position. Such bore 42 in the lower section post 4 is shown in FIG. 5, while the corresponding bore in the upper section post 28 is visibly concealed in both FIGS. 4 and 5, lying underneath the head of the linchpin 38.

Accordingly, upon removal of the linchpin 38 from the above-described bores in the upper section posts 28, the upper section 26 can adjusted to its raised position such that the bores in the posts 28 align with the bores 42 in the corresponding lower section posts 4. To secure the upper section 26 in the raised position, the linchpins 38 are inserted in the aligned bores, thereby passing through the posts 28 and 4 in such raised position of the upper section 26. The upper section posts 28 in turn are secured to such raised position via use of the retaining keys 40 on the linchpins 38.

Conversely, in adjusting the upper section 26 from its raised position to its lowered position, the retaining keys 40 are removed from the linchpins 38, enabling the linchpins 38 to then be removed from the above-described aligned bores of the posts 28 and 4. In turn, the upper section 26 is freed to rotate about its pivot axis, i.e., formed via the through bolts 34. Upon adjusting the upper section 26 to its lowered position, the linchpins 38, until they are needed in the future, can be inserted in the bores of the upper section posts 28 (as shown in FIG. 5) or inserted in the bores 42 of the lower section posts 4, and secured therein via their retaining keys 40.

With respect to use of linchpins 38 and corresponding retaining keys 40 as the second fastener assemblies, in certain embodiments, an elastic member 44 can be further used to limit the normal rattling between the linchpin 38 and the post 28 during normal operation of the vehicle 10. As shown in FIGS. 4 and 5, the elastic member 44 is located between the head of the linchpin 36 and the wall of the post 28 it protrudes from. In use, a head of the linchpin 38 contacts the elastic member 44 upon insertion of the linchpin 38. The elastic member 44 is depressed by the linchpin head when securing the retaining key 40 to the linchpin 38, and following such securement, the elastic member 44 expands to keep the linchpin 38 in a snug orientation, thereby being able to limit its movement, and rattling that may result there from.

As further illustrated in FIGS. 4 and 5, in certain embodiments, a bracket 46 is used at each connection area. The brackets 46 are used for a dual purpose, aligning and/or supporting the upper section post 28 upon being adjusted (whether to raised or lowered positions), and limiting any vibration transferred to the upper section post 28 on account of operation of the vehicle 10 (when in either raised or lowered positions). In certain embodiments, the bracket 46 includes at least three integrally joined plate-like segments, a mid-segment 46a and two end segments 46b and 46c that extend from opposing edges of the mid-segment 46a. In certain embodiments, the end segments 46b, 46c extend perpendicularly with respect to opposing planar surfaces of the mid-segment 46a. As such, the end segments 46b, 46c extend from the mid-segment 46a in opposite directions from each other.

As shown, the bracket mid-segment 46a is configured to lie between the adjoined upper section post 28 and lower section post 4. The mid-segment 46a defines a bore (not visibly shown) therein which is configured to align with the bores in the posts 28 and 4 used with the first fastener assembly (e.g., the through bolt 34 and corresponding nut). As a result, when the bolt 34 is used, it is fed through the corresponding bore in the upper section post 28, then the bore in the bracket mid-segment 46a, and finally the corresponding bore in the lower section post 4.

As described below, the bracket end segment 46b extends from the mid-segment 46a such that the bracket 46 extends about two adjacent walls of the lower section post 4 (its outer and rear walls); however, the invention should not be so limited. For example, the bracket 46 can be configured to extend about further surfaces of the post 4. In particular, the end segment 46b alone can be configured to extend about two adjacent walls of the lower section post 4, with the mid- and end segments 46a, 46b forming a "U" shape adapted to wrap about the post 4 along three of its walls. To that end, the end segment 46b can define a bore therein to align with the bore of the lower section post 4 configured for use with the through bolt 34. Consequently, the bracket's connection via the bolt 34 can be further stabilized. In particular, when the bolt 34 is used, it is fed through the corresponding bore in the upper section post 28, then the bore in the bracket mid-segment 46a, then the corresponding bore in the lower section post 4, and then such bore defined in the bracket end segment 46b.

Thus, the bracket end segment 46b is configured to confront one or more walls of the lower section post 4, while the end segment 46c is configured to confront a wall of the upper section post 28. As shown in FIGS. 4 and 5, in certain embodiments, the end segment 46b contacts at least the rearward wall of the lower section post 4. Further, as shown in FIG. 4, upon the upper section post 28 being adjusted to its raised position, the end segment 46c confronts the front wall of the post 28. In particular, the end segment 46c functions in aligning the upper section post 28 when in its raised position with the lower section post 4. To that end, the end segment 46b, via its contact with the rearward wall of the lower section post 4, counteracts the force transferred to the end segment 46c from the front wall of the upper section post 28 when in its raised position.

As shown in FIGS. 4 and 5, further extending from the bracket mid-segment 46a is a protrusion 46d. In certain embodiments, as illustrated, the protrusion extends outward from the same edge of the mid-segment 46a as the second end segment 46b yet in an opposing direction so as to confront the upper section post 28 when in its lowered position. In certain embodiments, the protrusion 46d at its distal end generally forms a plate 48 extending at a downward angle.

Further incorporated with the bracket 46, in certain embodiments, are dampening members 50. As shown in FIGS. 4 and 5, a first dampening member 50' and a second dampening member 50" protrude respectively from the bracket end segment 46c and the protrusion plate 48 (their supporting structures). In certain embodiments, as shown, each of the dampening members 50' and 50" partially extends through a bore defined in their supporting structures. Alternately, in certain embodiments, the dampening members 50', 50" can be operatively coupled to their supporting structures (e.g., via bonding agents or other attachments means).

In certain embodiments, the dampening members 50', 50" are formed of rubber, but should not be limited as such, as the members 50', 50" can be formed of any elastic, yet durable material. In certain embodiments, when the dampening members 50' and 50" extend through bores, each of the members 50' and 50" includes a first portion 50a' and 50a", respectively, that extends through the bore and includes a second portion 50b' and 50b", respectively, that is larger in size than the bores. Alternatively, if the dampening members 50', 50" do not involve being inserted in bores for securement (instead relying on additional means for securement, such as bonding compounds), the members 50', 50" can be wholly secured on their corresponding supportive structures.

In use, the first dampening member 50' is configured to contact the upper section post 28 in its raised position, while the second dampening member 50" is configured to contact the post 28 in its lowered position. Accordingly, in light of the dampening members 50', 50" protruding from their supportive structures, the members 50', 50" are configured to prevent the upper section post 28 from contacting their supporting structures. Furthermore, being formed of an elastic, yet durable material, they can effectively dissipate vibration stemming from the vehicle 10 from being transferred to the upper section posts 28 and in turn, the upper section 26.

While dampening member designs have been previously implemented with vehicles utilizing overhead frame structures, the advantages of this design relate to its functionality and simplicity. In particular, the dampening member design embodied herein facilitates dampening of the overhead frame structure 12 in multiple adjustable positions of the structure 12, with each position meeting the requirements of an industry-recognized safety standard. In addition, as described above, the multiple dampening members 50', 50" are incorporated on a single bracket 46. Accordingly, in facilitating multiple modes of dampening (for raised and lowered positions of the upper section 26), one simply needs to utilize the embodied bracket 46, involving a one step solution. Such streamlining with respect to provision of multiple modes of dampening for the structure, in turn, lends itself to limiting material and manufacturing costs for achieving such dampening functionality for the structure 12.

It will be appreciated the embodiments of the present invention can take many forms. The true essence and spirit of these embodiments of the invention are defined in the appended claims, and it is not intended the embodiments of the invention presented herein should limit the scope thereof. To that end, there are variations of the overhead frame structure 12 (not described above) that should be understood as falling within the scope of the invention, even if not detailed herein.

As described above, the invention relates to overhead frame structures utilized on vehicles, and in particular, to structures meeting an industry-recognized standard of rollover protection for the operator of the vehicle regardless of height adjustment made to the structures. While the overhead frame structure 12 of FIGS. 1-5 involves an upper section 26 that is rotatably adjustable about a generally horizontal axis with respect to the lower section 24, an alternate overhead frame structure design can involve an upper section that can be adjustably slid along a generally vertical axis with respect to the lower section. While such alternate design provide certain advantages (e.g., more flexibility with respect to the adjustable height of the structure), there are also drawbacks (e.g., more complicated and time-consuming adjustment process) as compared to the embodied overhead frame structure 12 of FIGS. 1-5.

What is claimed is:

1. An overhead frame structure for a vehicle, comprising:
a lower section having a crossbar joining upper ends of the lower section; and
an upper section having a crossbar joining upper ends of the upper section, the upper section being operably coupled to the lower section and being rotatably adjustable to different positions in relation to the lower section, two of the positions involving a raised position for the upper section and a lowered position for the upper section, the overhead frame structure configured to provide rollover protection for an operator of the vehicle regardless of whether the upper section is in the raised position or the lowered position.

2. The structure of claim 1 wherein one of the lower section and upper section are situated for taking on differing prominent roles in rollover protection depending on the position of the upper section crossbar.

3. The structure of claim 2 wherein when the upper section is in the raised position, the upper section crossbar is at a height higher than that of the lower section crossbar.

4. The structure of claim 3 wherein when the upper section is in the raised position, the upper section crossbar is vertically aligned with the lower section crossbar.

5. The structure of claim 2 wherein when the upper section is in the raised position, the upper section provides the primary means of rollover protection.

6. The structure of claim 2 wherein when the upper section is in the lowered position, the lower section provides the primary means of rollover protection.

7. The structure of claim 1 wherein the upper section is coupled to the lower section via at least one bracket, each bracket including separate members for one or more of aligning and supporting posts of the upper section in each of the raised and lowered positions of the upper section.

8. The structure of claim 7 wherein each bracket further includes a dampening member protruding from the separate members and toward the upper section posts in each of the raised and lowered positions of the upper section, wherein the dampening members are configured to separate the upper section posts from the bracket to limit vibration of the upper section.

9. The overhead frame structure of claim 1 wherein when the upper section is in the raised position, the upper section and the lower section each provide means of rollover protection.

10. An overhead frame structure for a vehicle, comprising:
a first segment comprising a first crossbar joining upper ends of the first segment; and
a second segment comprising a second crossbar joining upper ends of the second segment, the second crossbar being operably coupled to the first crossbar such that the second crossbar can be rotatably adjusted to different positions with respect to the first crossbar, two of the positions involving the second crossbar being positioned at a lower height with respect to the first crossbar and at a higher height with respect to the first crossbar, the second crossbar vertically offset from the first crossbar when the second crossbar is at the higher height, the overhead frame structure configured to provide rollover protection for an operator of the vehicle regardless of whether the second crossbar is at the lower height or the higher height.

11. The structure of claim 10 wherein each of the first and second crossbars are joined to upper portions of posts, wherein the posts of the second crossbar are operably joined to the posts of the first crossbar.

12. The structure of claim 11 wherein one of the first crossbar and adjoined posts and the second crossbar and adjoined posts are situated for taking on differing prominent roles in rollover protection depending on the position of the second crossbar.

13. The structure of claim 12 wherein when the second crossbar is positioned at the higher height, each of the first and second crossbars are situated for providing rollover protection to the operator.

14. The structure of claim 12 wherein when the second crossbar is positioned at the higher height, the second crossbar and adjoined posts provide the primary means of for rollover protection.

15. The structure of claim 12 wherein when the second crossbar is positioned at the lower height, the first crossbar and adjoined posts provide the primary means of rollover protection.

16. The structure of claim 11 wherein each of the posts adjoined to the second crossbar are coupled to a corresponding one of the posts adjoined to the first crossbar via at least one bracket, each bracket including separate members for one or more of aligning and supporting the posts adjoined to the second crossbar in each of the higher and lower height positions.

17. The structure of claim 16 wherein each bracket further includes a dampening member protruding from the separate members and toward the posts adjoined to the second crossbar in each of the higher and lower height positions, wherein the dampening members are configured to separate the posts adjoined to the second crossbar from the bracket to limit vibration of the upper section.

18. An overhead frame structure for a vehicle, comprising:
a lower section including two posts having upper ends joined via a crossbar;
an upper section including two posts having upper ends joined via a crossbar, each of the upper section posts being operably coupled and made rotatably adjustable to a corresponding one of the lower section posts; and
at least one bracket coupling the upper and lower section posts, each bracket including separate members for one or more of aligning and supporting the upper section posts in each of a raised position and a lowered position of the upper section with respect to the lower section;
wherein the upper section crossbar is vertically offset from the lower section crossbar in the raised position of the upper section, and wherein the overhead frame structure is configured to provide rollover protection for an operator of the vehicle regardless of whether the upper section is in the raised position or the lowered position.

19. The structure of claim 18 wherein when the upper section is in the raised position, the upper section crossbar is at a height higher than that of the lower section crossbar.

20. The structure of claim 19 wherein when the upper section is in the raised position, the upper section crossbar is vertically aligned with the lower section crossbar.

21. The structure of claim 18 wherein when the upper section crossbar is in the raised position, the upper section crossbar and adjoined posts provide primary means of rollover protection.

22. The structure of claim 18 wherein each bracket further includes a dampening member protruding from the separate members and toward the upper section posts in each of the raised and lowered positions of the upper section, wherein the dampening members are configured to separate the upper section posts from the bracket to limit vibration of the upper section.

23. The structure of claim 22 wherein each of the dampening members is fed through a bore in the corresponding bracket separate member.

24. The structure of claim 18 wherein when the upper section crossbar is in the lowered position, the lower section crossbar and adjoined posts provide primary means of rollover protection.

* * * * *